United States Patent
Minemura et al.

(10) Patent No.: US 9,463,795 B2
(45) Date of Patent: Oct. 11, 2016

(54) VEHICLE DRIVING SUPPORT APPARATUS FOR EXECUTING COLLISION AVOIDANCE OPERATIONS BASED ON POSITION AND MOTION CONDITION OF TARGET OBJECT

(71) Applicant: DENSO CORPORATION, Kariya, Aichi-pref. (JP)

(72) Inventors: Akitoshi Minemura, Kariya (JP); Masayoshi Takeda, Kariya (JP); Yuusuke Matsumoto, Aichi-ken (JP); Taku Sakima, Chiryu (JP); Naoki Kawasaki, Kariya (JP); Syunya Kumano, Gothenburg (SE)

(73) Assignee: DENSO CORPORATION, Kariya, Aichi-pref. (JP)

( * ) Notice: Subject to any disclaimer, the term of this patent is extended or adjusted under 35 U.S.C. 154(b) by 17 days.

(21) Appl. No.: 14/690,747

(22) Filed: Apr. 20, 2015

(65) Prior Publication Data
US 2015/0298692 A1 Oct. 22, 2015

(30) Foreign Application Priority Data
Apr. 21, 2014 (JP) .................................. 2014-087518

(51) Int. Cl.
| | | |
|---|---|---|
| *B60T 7/12* | (2006.01) | |
| *G05D 1/00* | (2006.01) | |
| *G06F 7/00* | (2006.01) | |
| *G06F 17/00* | (2006.01) | |
| *B60W 30/08* | (2012.01) | |
| *B60Q 9/00* | (2006.01) | |
| *B60T 7/22* | (2006.01) | |

(52) U.S. Cl.
CPC .............. *B60W 30/08* (2013.01); *B60Q 9/008* (2013.01); *B60T 7/12* (2013.01); *B60T 7/22* (2013.01); *B60T 2201/022* (2013.01)

(58) Field of Classification Search
USPC ...... 701/301, 96, 1, 300, 45, 23, 24, 70, 93; 340/436, 438, 903, 455, 901, 904; 342/29, 70, 72, 71, 61; 180/271, 274, 180/275
See application file for complete search history.

(56) References Cited

U.S. PATENT DOCUMENTS 7,124,027 B1 * 10/2006 Ernst, Jr. ............... B60W 30/09
340/435
9,150,223 B2 * 10/2015 Minemura ............ B60W 50/04
(Continued)

FOREIGN PATENT DOCUMENTS

| JP | H07-230600 A | 8/1995 |
|---|---|---|
| JP | 3075064 | 6/2000 |

(Continued)

*Primary Examiner* — Ronnie Mancho
(74) *Attorney, Agent, or Firm* — Harness, Dickey & Pierce, P.L.C.

(57) ABSTRACT

A driving support apparatus installed in a host vehicle calculates an overlap ratio relating to a target object positioned ahead of the host vehicle within the same traffic lane, as the ratio of the width of the target object to its lateral distance from a lane marker line of the traffic lane, and also detects the motion condition of the object (i.e., stationary, moving towards, or in the same direction as the host vehicle, or moving laterally with respect to the forward direction of the host vehicle). An amount of compensation for retarding or advancing the commencement of a collision avoidance operation by the driving support apparatus is determined based on the overlap ratio and/or the motion condition of the target object.

9 Claims, 5 Drawing Sheets

(56) References Cited

U.S. PATENT DOCUMENTS

| | | | |
|---|---|---|---|
| 2005/0004760 A1 | 1/2005 | Urai et al. | |
| 2005/0273218 A1* | 12/2005 | Breed | B60C 11/24 701/2 |
| 2010/0253542 A1* | 10/2010 | Seder | G01S 7/22 340/932.2 |
| 2010/0253594 A1* | 10/2010 | Szczerba | G01S 13/723 345/7 |
| 2012/0323474 A1* | 12/2012 | Breed | B60W 30/04 701/117 |
| 2014/0309814 A1* | 10/2014 | Ricci | B60Q 1/00 701/2 |
| 2015/0197248 A1* | 7/2015 | Breed | G08G 1/09626 701/93 |
| 2015/0298692 A1* | 10/2015 | Minemura | B60W 30/08 701/70 |

FOREIGN PATENT DOCUMENTS

| | | |
|---|---|---|
| JP | 2004-330950 A | 11/2004 |
| JP | 2008-102690 | 5/2008 |
| JP | 2009-169744 A | 7/2009 |
| JP | 2011-197915 | 10/2011 |
| JP | 2014-067169 A | 4/2014 |

* cited by examiner

VEHICLE DRIVING SUPPORT APPARATUS FOR EXECUTING COLLISION AVOIDANCE OPERATIONS BASED ON POSITION AND MOTION CONDITION OF TARGET OBJECT

CROSS-REFERENCE TO RELATED APPLICATIONS

This application is based on and incorporates herein by reference Japanese Patent First Application No. 2014-087518 filed on Apr. 21, 2014.

BACKGROUND OF THE INVENTION

1. Field of Application

The present invention relates to a driving support apparatus for installation in a motor vehicle, for assisting the vehicle driver in avoiding collision with objects such as preceding vehicles. In particular the invention relates to a driving support apparatus for use when driving in a traffic lane whose limits are defined by a pair of (left side, right side) lane marker lines. The term "traffic lane" is used herein in a general sense, to signify a vehicle path which is delimited by a pair of marker lines on the surface of a street, freeway, etc.

2. Description of Related Art

Techniques are known for providing driving support, to assist in preventing collisions with objects located ahead of a vehicle (referred to in the following as the host vehicle), whereby such objects (referred to in the following as target objects) are detected using a radar apparatus, camera apparatus, etc., installed on the host vehicle, and whereby driving support operations are executed based on the detection results.

For example with a technique described in Japanese patent publication No. 3075064 (referred to in the following as reference 1) when the host vehicle driving in a traffic lane and it is detected that a preceding vehicle is intruding into that traffic lane (i.e., is positioned partially within that traffic lane and partially within an adjacent traffic lane) a ratio referred to as a "preceding vehicle intrusion level" is derived. This is defined as the ratio W/Wo, where Wo is the total width of the preceding vehicle and W is the width of the part of the preceding vehicle which is protruding into the traffic lane of the host vehicle. Driving support, for assisting the driver of the host vehicle to avoid collision with the preceding vehicle, is executed based on the derived value of the preceding vehicle intrusion level.

As used herein, "preceding object" or "preceding vehicle" signifies an object or vehicle which is positioned ahead of a host vehicle and is moving in the same direction as the host vehicle. "Stationary object" or "stationary vehicle" signifies an object or vehicle which is stationary and is positioned ahead of the host vehicle. "Oncoming object" or "oncoming vehicle" signifies an object or vehicle which is positioned ahead of a host vehicle and is moving in the opposite direction to the host vehicle. Motion of a preceding vehicle or object may also have a lateral component (in a direction at right angles to the forward direction of the host vehicle)

With the technique described in reference 1, when the preceding vehicle intrusion level is relatively large, the judgement distance is increased accordingly. Here, "judgement distance" signifies the minimum separation distance between the host vehicle and the preceding vehicle at which a driving support operation (such as emission of warning signals to the host vehicle driver, braking intervention, etc.) will be initiated. Conversely, if the overlap ratio is relatively small, the judgement distance is decreased.

However, if the judgement distance is determined based on the above-described preceding vehicle intrusion level, the timing at which a driving support operation is commenced may not be appropriate. For example at the time of detection, the preceding vehicle may be moving in a lateral direction for exiting from the traffic lane of the host vehicle, thereby reducing the possibility of a collision. However with the prior art technology of reference 1 in such a case, the judgement distance will be made large if the preceding vehicle intrusion level is large, irrespective of any lateral-direction motion of the preceding vehicle. As a result, the driving support operations may be commenced excessively early, and may not actually be necessary, since the preceding vehicle may rapidly exit from the traffic lane of the host vehicle.

SUMMARY OF THE INVENTION

Hence it is desired to overcome the above problem, by providing a driving support apparatus which appropriately determines the timings of commencement of driving support operations for avoiding collision with a detected target object.

The driving support apparatus is applicable to a host vehicle equipped with a target object detection apparatus (e.g., radar apparatus) for detecting target objects positioned ahead of the host vehicle, and equipped with a lane marker line detection apparatus (e.g., camera apparatus) for detecting a pair of lane marker lines which delimit a traffic lane in which the host vehicle is running.

The driving support apparatus basically comprises a target object acquisition section, a lane marker line information acquiring section, an overlap ratio calculation section, a motion condition detection section, and a timing compensation section, whose respective functions are mainly implemented by a computer in executing a stored program.

The target object acquisition section serves to acquire information relating to a target object such as a preceding vehicle (e.g., position of the object relative to the host vehicle, etc.), based on detection results produced from the target object detection apparatus. The lane marker line information acquiring section serves to acquire information relating to the pair of lane marker lines of the traffic lane in which the host vehicle is running, based on detection results produced from the lane marker line detection apparatus. The overlap ratio calculation section serves to calculate an overlap ratio as the ratio of a lateral distance (distance between one of the lane marker lines and the target object) and the width of the target object. Preferably, respective values of overlap ratio are calculated with respect to the left-side and right-side lane marker lines of the traffic lane. The values of lateral distance and width are as measured in a direction at right angles to the forward direction of the host vehicle, and respectively as viewed from the host vehicle, and are obtained based on the lane marker line information and on the target object information. The motion condition detection section serves to detect the motion condition of the target object (e.g., whether the object is stationary or moving, and the direction of motion) based upon the target object information.

The driving support apparatus is characterized in comprising a timing compensation section, which sets a compensation amount based upon either or both of the overlap ratio calculated by the ratio calculation section and the motion condition detected by the motion condition detection section. Here, "compensation amount" signifies an amount of adjustment (i.e., advancement or retardation) which is applied to the timing of commencement of a driving support operation, where the driving support operation will potentially be executed for avoiding collision between the target object and the host vehicle.

Use of the above-described "preceding vehicle intrusion level" of the prior art, has the disadvantage that (when the preceding vehicle is entirely within the traffic lane of the host vehicle, separated from each lane marker line) no information is provided as to the lateral position of the preceding vehicle in the traffic lane. However the overlap ratio defined above provides such information. Specifically, the ratio indicates the portion of the travel lane of the host vehicle which is occupied by the preceding vehicle, and the position of that occupied portion. This enables more effective application of driving support for avoiding collision with the preceding vehicle.

Furthermore the probability of collision with a target object such as a preceding vehicle depends also upon the motion condition of the target object, i.e., stationary, moving away from, or moving towards the host vehicle. Hence with the present invention, the probability of collision (which determines the compensation amount set by the timing compensation section) is calculated based not only on the overlap ratio but also upon the motion condition of the target object. This further enables effective application of driving support for avoiding collision with a target object.

For example the compensation section sets the compensation amount as an amount of retardation of the TTC operation timing (time point at which a driving support operation for collision avoidance will be commenced) when the target object is judged to be moving laterally away from the forward direction of the host vehicle (e.g., is about to move into an adjacent traffic lane).

From another aspect, the compensation section of the driving support apparatus is preferably configured to set the compensation amount based only upon the calculated value of the overlap ratio, when the target object is judged to be stationary, and to set the compensation amount based upon the calculated value of the overlap ratio and upon the motion condition of the target object, when the target object is judged to be in motion.

Furthermore the compensation section is preferably configured such that, when a plurality of respectively different types of driving support operation can be selected to be executed with respect to a detected target object, the compensation amount is also set in accordance with the selected type of driving support operation.

For example, when the types of driving support operation include emission of warning indications and execution of braking, the compensation amount which is applied in the case of emission of warning indications is is preferably made greater than the amount which is applied in the case of braking.

Furthermore the compensation section is preferably configured such that, when the target object is judged to be a preceding vehicle, the compensation amount is also set in accordance with the type of the preceding vehicle (i.e., with the size of the preceding vehicle being judged based upon the vehicle type). For example the greater the width of a preceding vehicle, the greater will be the possibility of collision with the host vehicle.

DESCRIPTION OF PREFERRED EMBODIMENTS

Figure 1:
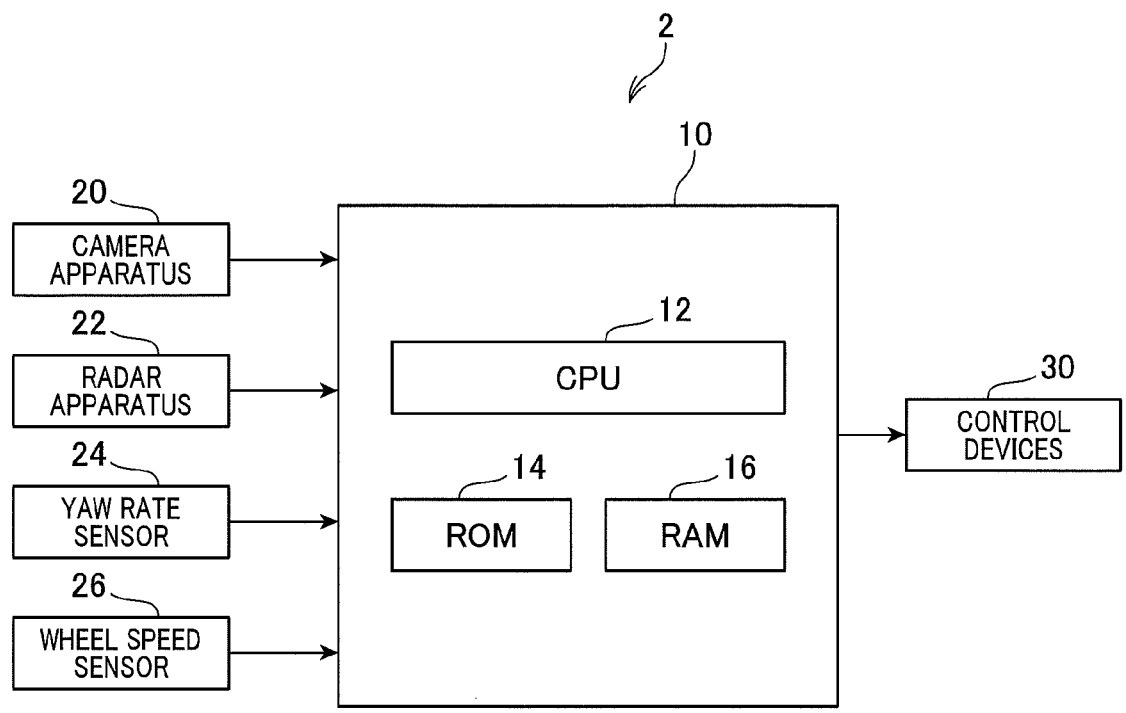
FIG. 1 is block diagram showing the general configuration of an embodiment of a driving support apparatus.

An embodiment of a driving support apparatus is described in the following referring to the drawings. The embodiment is a PCS (pre-crash safety system) 2, which is installed on a motor vehicle referred to in the following as the host vehicle. When the PCS 2 judges that there is a danger of collision between the host vehicle and a detected target object (preceding vehicle, stationary object, etc.) which is located ahead of the host vehicle, the PCS 2 executes operations (such as emission of warning signals directed to the host vehicle driver and performing braking intervention) for assisting in avoiding collision, or for reducing the damage caused if a collision occurs.

As shown in FIG. 1, the PCS 2 includes a driving support apparatus 10, is various sensors, and a set of controlled devices (brake actuators, etc.) 30. The sensors shown are a camera apparatus 20, a radar apparatus 22, a yaw rate sensor 24 and a wheel speed sensor 26, however other sensors may also be utilized. The camera apparatus 20 is a stereoscopic (electronic) camera apparatus which captures images of a region ahead of the host vehicle, with the image contents being analyzed to obtain target object information concerning objects which appear in the captured images. The information derived for a target object includes the estimated distance of the object from the host vehicle, its direction with reference to the host vehicle (i.e., azimuth angle with respect to the forward direction of the host vehicle), the type of object and the shape of the object. The types into which a target object may be classified, with this embodiment, consist of "motor vehicle", "pedestrian", and "neither motor vehicle nor pedestrian". However other classifications of target objects could also be applied, such as "bicycle", "animal", etc., for example, when necessary for a country in which the driving support apparatus is to be utilized, The operation of the PCS 2 is described in the following assuming that the host vehicle is running in a traffic lane whose limits are defined by a pair of (left side, right side) lane marker lines, which are typically white in color and are formed on the road surface. The camera apparatus 20 is configured to also detect lane marker line information, expressing the relative position of the host vehicle with respect to the lane marker lines, the shape of the lane marker lines (i.e., straight or curved), etc.

The radar apparatus 22 directionally transmits electromagnetic waves in the millimeter wavelength band, which are reflected from target objects located ahead of the host vehicle. The radar apparatus 22 thereby derives target object information expressing the distance, direction angle and speed of each detected target object relative to the host vehicle, based on resultant reflected waves from the target objects. The camera apparatus 20 and the radar apparatus 22 each execute the above-described detection operations at predetermined periodic intervals, to update the target object information and the lane marker line information.

The yaw rate sensor 24 can be of a generally utilized type, for detecting the yaw rate of the host vehicle. The wheel speed sensor 26 detects the rotation speed of the road wheels of the host vehicle, with the running speed of the host vehicle being calculated by the driving support apparatus 10 based on the road wheel rotation speed. The driving support apparatus 10 acquires information concerning the running condition of the host vehicle based on the detection signals from the yaw rate sensor 24 and the wheel speed sensor 26.

The driving support apparatus 10 mainly consists of a usual type of microcomputer, having a CPU (central processing unit) 12, ROM (read-only memory) 14, RAM (random access memory) 16, etc. The CPU 12 performs various processing operations for effecting driving support, in accordance with detection results obtained from the camera apparatus 20, radar apparatus 22, yaw rate sensor 24 and wheel speed sensor 26, by executing a program which has been stored beforehand in a data storage medium such as the ROM 14. In performing these processing operations, the driving support apparatus 10 controls the controlled devices 30 in accordance with the required form of driving support.

The controlled devices 30 include (but are not limited to) actuators which drive the brakes, steering mechanism, seat belts, etc., a warning signal generating apparatus, etc.

The driving support apparatus 10 predicts a TTC (Time To Collision) as an estimated time interval which will elapse before a collision occurs between the host vehicle and a detected target object. In the case of a plurality of detected target objects, respective values of TTC are predicted for each target object.

Based on the TTC that is estimated for a target object, the driving support apparatus 10 controls the controlled devices 30 to determine the respective TTC operation timings, at which various types of driving support will be commenced, for avoiding collision with the target object, i.e., the timings for actuating the vehicle brakes, intervening in the steering operations being performed by the vehicle driver, tensioning the seat belts, emitting warning signals directed to the driver, etc.

Respectively different amounts of compensation (advancement or retardation) may be applied to the various TTC operation timings. Hence In the following description "compensation of the TTC operation timing" is to be understood as compensation which is applied to any specific type of driving support operation, such as braking intervention.

Each TTC operation timing (e.g., for commencement of braking intervention) is determined based on the relative speed and relative position of the target object with respect to the host vehicle, the type of object, the running environment of the host vehicle. Information concerning the running environment can specify, for example, whether or not the road surface is slippery due to ice or snow.

The driving support apparatus 10 is configured to apply compensation for retarding the TTC operation timing when the reliability of the detection results obtained for the target object from the camera apparatus 20 and the radar apparatus 22 for the target object, etc. is judged to be below a predetermined level. Furthermore with this embodiment, the driving support apparatus 10 compensates the TTC operation timing based on a lane marker line overlap ratio (described hereinafter) and motion status of the target object.

Figure 2:
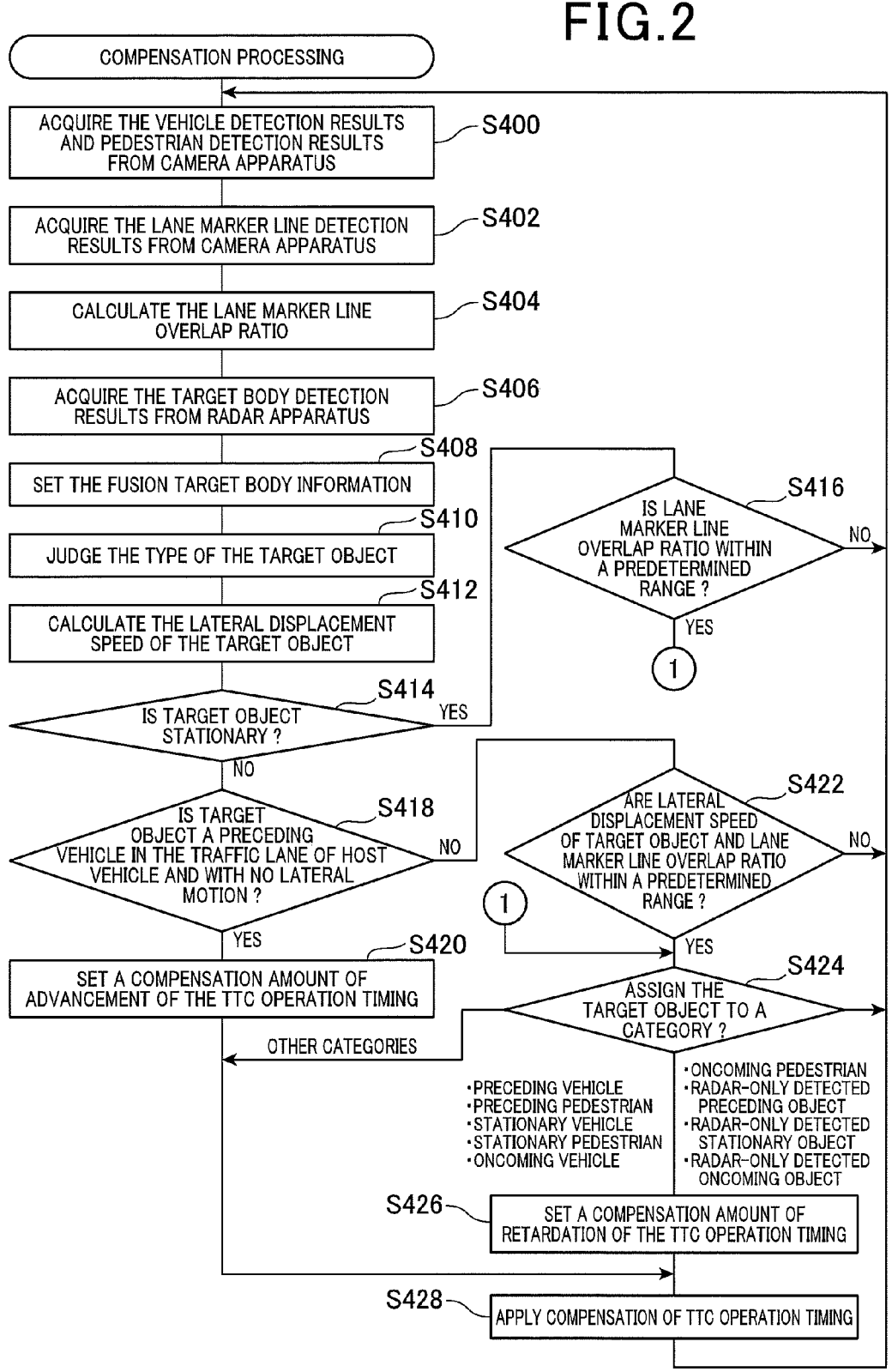
FIG. 2 is a flow diagram for describing commencement timing compensation processing which is executed by the embodiment.
Figure 3A:
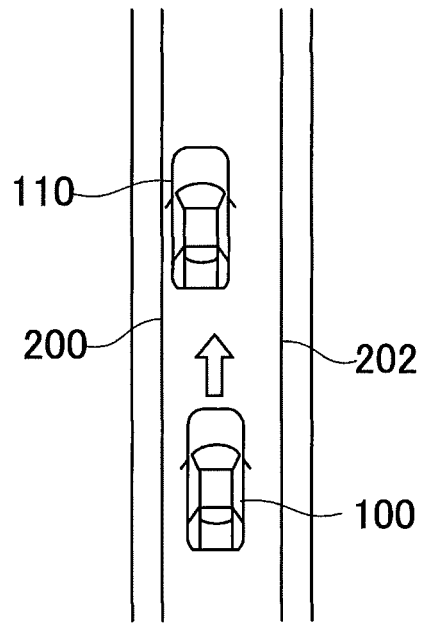
FIGS. 3A, 3B and 4A, 4B are conceptual diagrams for illustrating positions of vehicles with respect to lane marker lines of a traffic lane.
Figure 3B:
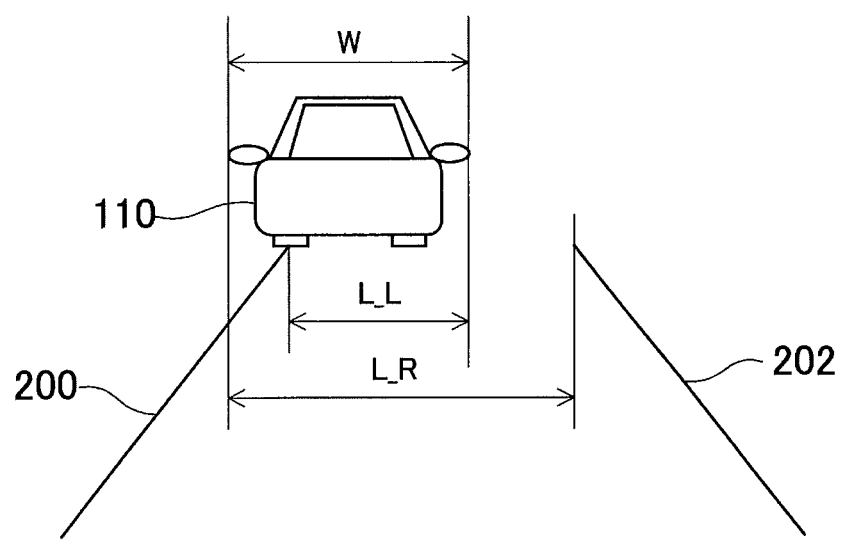
Figure 4A:
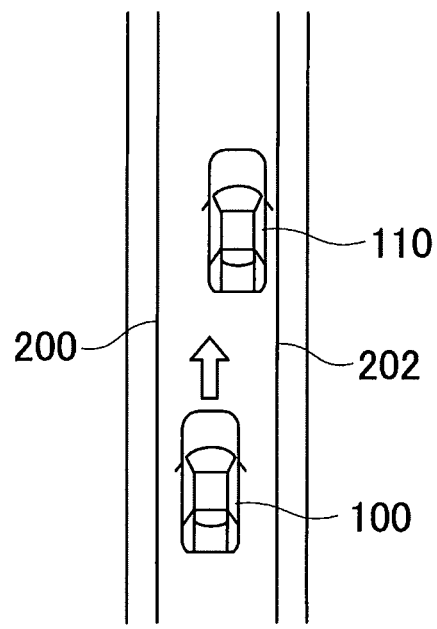
Figure 4B:
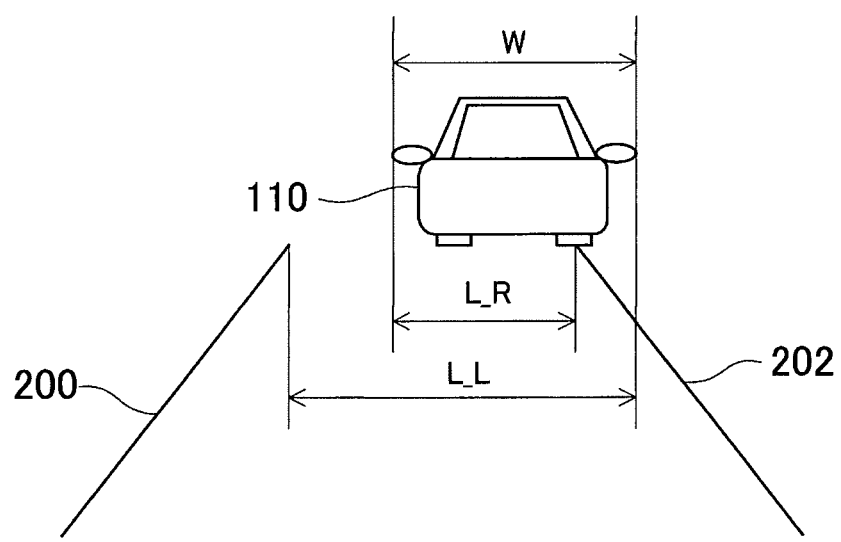

Compensation Processing FIG. 2 is a flow diagram showing compensation processing which is executed by the driving support apparatus 10 for compensating a TTC operation timing that is set with respect to a target object. The processing sequence shown in FIG. 2 is executed in continuous repetition during operation of the driving support apparatus.

Firstly (step S400) the driving support apparatus 10 acquires target object information expressed by detection results obtained from the camera apparatus 20 concerning an object located ahead of the host vehicle, i.e., information indicating whether the target object is a vehicle or a pedestrian. Lane marker line information expressed by detection results from the camera apparatus 20 is also obtained (step S402), concerning the lane marker lines of the traffic lane in which the host vehicle is running.

Based on the target object information and lane marker line information thus obtained, the driving support apparatus 10 then calculates the width W of the target object, the distance (L_L) of the right side of the target object from the left-side lane marker line, and the distance (L_R) of the left side of the target object from the right-side lane marker line, as viewed from the host vehicle.

The left-side and right-side lane marker line overlap ratios are then calculated using the following equations (1) and (2):

$$\text{Left-side lane marker line overlap ratio} = L\_L/W \qquad (1)$$

$$\text{Right-side lane marker line overlap ratio} = L\_R/W \qquad (2)$$

The above is illustrated by the conceptual diagrams of FIGS. 3A, 3B and 4A, 4B, in which the target object is a preceding vehicle 110, viewed from a host vehicle 100 which is running in a traffic lane delimited by left-side and right-side lane marker lines 200 and 202 respectively.

Figure 5A:
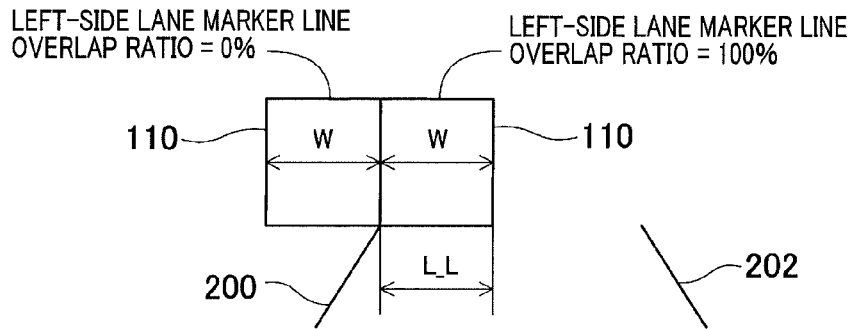
FIGS. 5A and 5B are conceptual diagrams for illustrating values attained by a lane marker line overlap ratio when a preceding vehicle is adjacent to a left-hand lane marker line and to a right-hand lane marker line respectively.

As illustrated in the example of FIG. 5A, when the distance L_L between the left-side lane marker line 200 and the right-hand side of a preceding vehicle 110 is zero (i.e., when the preceding vehicle 110 is outside the traffic lane of the host vehicle, but with the right-hand side of the preceding vehicle 110 positioned over the left-side lane marker line 200), the left-side lane marker line overlap ratio is 0%. As the distance L_L successively increases (i.e., as the preceding vehicle 110 moves laterally towards the right-side lane marker line 202), the left-side lane marker line overlap ratio increases accordingly. In particular, as the value of L_L increases above the width W of the preceding vehicle 110, the value of the left-side lane marker line overlap ratio successively increases above 100%.

Figure 5B:
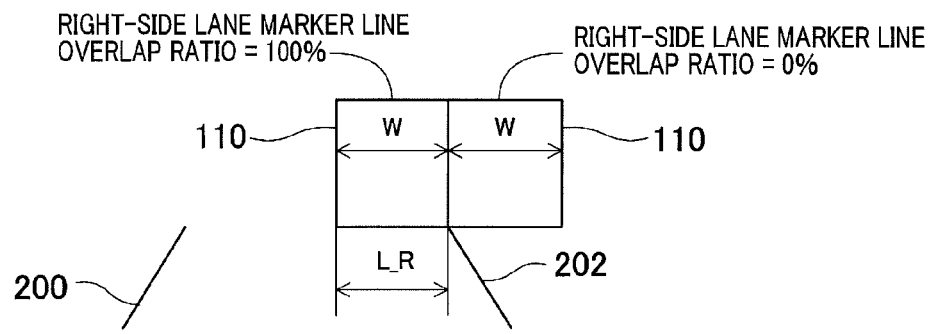

Similarly as illustrated in the example of FIG. 5B, when the distance L_R between the right-side lane marker line 202 and the left-hand side of a preceding vehicle 110 is zero, the right-side lane marker line overlap ratio is 0%. As the distance L_R successively increases (as the preceding vehicle 110 moves laterally towards the left-side lane marker line 200), the right-side lane marker line overlap ratio increases accordingly, i.e., as L_R increases above the width W of the preceding vehicle 110, the right-side lane marker line overlap ratio successively increases above 100%.

With the present embodiment, the distance L_L between the left-side lane marker line and the right-hand side of a target object is used to express the position relationship of the target object to the left-side lane marker line. However it would be equally possible to utilize the distance between the left-side lane marker line and some other predetermined location on the target object, e.g., the center of the target object, the left-hand side of the target object, etc., as appropriate. Similarly, instead of utilizing the distance L_R described above, it would be equally possible to utilize the distance between the right-side lane marker line and some other predetermined location on the target object.

Furthermore, it would be possible to use only the right-side lane marker line overlap ratio, or only the left-side lane marker line overlap ratio, e.g., with one of these being selected for use in accordance with the lateral position of the target object.

Following step S404, the driving support apparatus 10 acquires target object information from detection results obtained for the target object by the radar apparatus 22 (step S406), then combines that target object information with the target object information obtained in step S400 from the detection results of the camera apparatus 20, to obtain information referred to in the following as fusion target object information (step S408).

The driving support apparatus 10 then executes processing (step S410) for assigning the target object to one of a set of ten categories (1) to (10) described below, for use in a branching operation of a subsequent step (S424).

The categories are assigned based on the target object information obtained from the camera apparatus 20 and the radar apparatus 22. Of these categories, the categories (7) to (9) are assigned to target objects which could not be detected by the camera apparatus 20, but only by the radar apparatus 22. The categories are as follows:

(1) A preceding vehicle (a vehicle positioned ahead of the host vehicle, being driven in the same direction as the host vehicle).

(2) A pedestrian positioned ahead of the host vehicle, walking in the same direction as the host vehicle.

(3) A stationary vehicle positioned ahead of the host vehicle.

(4) A stationary pedestrian positioned ahead of the host vehicle.

(5) An oncoming vehicle (a vehicle positioned ahead of the host vehicle, being driven towards the host vehicle).

(6) An oncoming pedestrian positioned ahead of the host vehicle, walking towards the host vehicle.

(7) ("radar-only detected") A target object positioned ahead of the host vehicle, moving in the same direction as the host vehicle, detected only by the millimeter-wave radar apparatus.

(8) ("radar-only detected") A stationary target object positioned ahead of the host vehicle, detected only by the millimeter-wave radar apparatus.

(9) ("radar-only detected") A target object positioned ahead of the host vehicle, moving towards the host vehicle, detected only by the millimeter-wave radar apparatus.

(10) A target object which is outside all of the categories (1) to (9).

Thus, the driving support apparatus 10 classifies the target objects according to three types of motion condition (i.e., preceding, stationary, or oncoming) and according to type of object (vehicle or pedestrian), with combinations of these types constituting a total of 9 categories, to which is added a category of objects that are outside these 9 categories. For example referring to the diagrams of FIG. 6, these show examples of a stationary vehicle 120 positioned ahead of a host vehicle 100, a preceding vehicle 122, and an oncoming vehicle 124.

Following step S410, in step S412, the driving support apparatus 10 calculates the speed of lateral motion of the target object, based on the history of successive positions attained by the object up to the current time point. Each of these position is derived from fusion target object information that has been calculated in an execution of step S408. Designating T as a detection time interval of the fusion target object information (derived from detection results of the camera apparatus 20 and radar apparatus 22 as described above) during which six successive lateral positions P1~P6 of a target object are obtained, the speed of lateral motion of the target object is calculated from the following equation (3):

$$(P4-P1)/3T+(P5-P2)/3T+(P6-P3)/3T/3 \quad (3)$$

Figure 6:
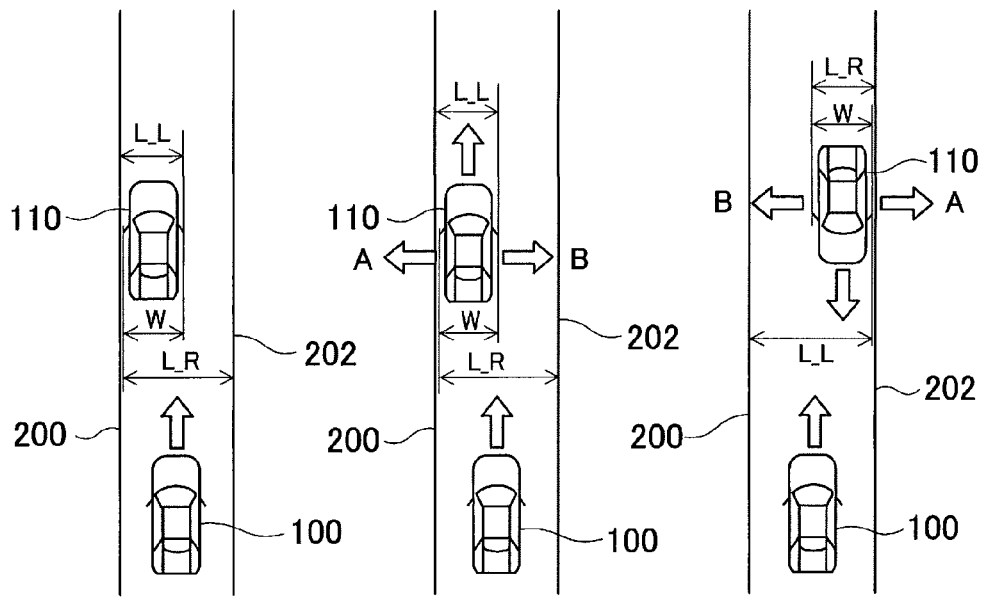
FIG. 6 shows conceptual diagrams for illustrating motion conditions of a vehicle positioned ahead of a host vehicle.

If it is judged in step S410 that the target object is a stationary object such as the stationary vehicle 120 in FIG. 6, resulting in a YES decision in step S414, a decision is made (step S416) as to whether the lane marker line overlap ratio (calculated for the target object using equations (1) and (2)) satisfies (i.e., is within the range defined by) either one of the following equations (4) and (5):

$$150\% \leq \text{[left-side lane marker line overlap ratio]} \leq 500\% \text{ AND } 0\% < \text{[right-side lane marker line overlap ratio]} \leq 100\% \quad (4)$$

$$150\% \leq \text{[right-side lane marker line overlap ratio]} \leq 500\% \text{ AND } [0\% < \text{[left-side lane marker line overlap ratio]} \leq 100\% \quad (5)$$

If the target object is a stationary object and the lane marker line overlap ratio satisfies either of the equations (4) and (5), this signifies that the target object is close to a lane marker line. Specifically, if equation (4) is satisfied, this indicates that the target object is directly adjacent to (or overlaps) the right-side lane marker line. If equation (5) is satisfied, this indicates that the target object is directly adjacent to (or overlaps) the left-side lane marker line. In either case, the driving support apparatus 10 judges that there is only a low possibility of collision between the host vehicle and the target object.

However if the target object is a stationary object and the lane marker line overlap ratio does not satisfy either of the equations (4) and (5), this signifies that the target object is separated from both the right-side and the left-side lane marker lines. Hence in that case it is judged that the possibility of collision between the host vehicle and the target object is not low.

Thus if neither of the equations (4) and (5) is satisfied (NO in step S416), the driving support apparatus 10 judges that the target object is not a stationary object for which the TTC operation timing is to be retarded, and hence step S400 is returned to. If the lane marker line overlap ratio satisfies either of the equations (4) and (5) (YES in step S416), the driving support apparatus 10 judges that the target object is a stationary object for which the TTC operation timing is to be retarded, and step S424 is then executed.

If the target object is judged to be a mobile object (NO in step S414), the driving support apparatus 10 judges whether the mobile object has been positioned within the same traffic lane as the host vehicle during a predetermined time interval, moving in a stable condition without lateral displacement motion (step S418).

For example the judgement can be such that, if the target object has been detected as a preceding vehicle whose lane marker line overlap ratio does not satisfy either of the equations (4) and (5), and which has a lateral displacement speed that is below a predetermined minimum threshold value, and which has been positioned within the same traffic lane as the host vehicle for at least a predetermined duration (extending to the current time point), then a YES decision will be made in step S418.

If a YES decision is reached in step S418, the driving support apparatus 10 judges that a collision between the host vehicle and the preceding vehicle can be more easily avoided by advancing the TTC operation timing. Hence, a compensation amount of advancement of the TTC operation timing is set (step S420), and step S428 is then executed. Thus with this embodiment, the TTC operation timing is advanced only when the target object is a preceding vehicle that has been running in the same traffic lane as the host vehicle for at least a predetermined duration, separated from each of the lane marker lines (i.e., positioned substantially centrally in the traffic lane), in a stable running condition, without significant lateral motion.

If it is determined that the target object is not a preceding vehicle which satisfies these conditions (NO in step S418), the driving support apparatus 10 judges (step S422) whether the speed of lateral motion and the lane marker line overlap ratio of the target object satisfy (i.e., are within the ranges defined by) either of the following equations (6) and (7). A positive value for the speed of lateral motion signifies that the lateral motion of the target object is in a rightward direction, while a negative value signifies that the lateral motion is in a leftward direction, as seen from the host vehicle.

150%≤[left-side lane marker line overlap ratio]≤ 500% AND 0%<[right-side lane marker line overlap ratio]≤100% AND [average speed of lateral motion]≥0.5 m/s. (6)

150%≤[right-side lane marker line overlap ratio]≤ 500% AND 0%<[left-side lane marker line overlap ratio]≤100% AND [average speed of lateral motion]≥−0.5 m/s (7)

If the target object (mobile object) satisfies equation (6), then the driving support apparatus 10 judges that the target object is close to the right-side lane marker line, and is moving rightward at a speed of lateral motion exceeding the predetermined value (i.e., 0.5 m/s). If the target object satisfies equation (7), then it is judged that the target object is close to the left-side lane marker line, and is moving leftward at a speed of lateral motion exceeding the predetermined value In either case, since this indicates that the target object is moving away from the forward direction of the host vehicle, the driving support apparatus 10 judges that the possibility of collision is low. For example as illustrated in FIG. 6, if the preceding vehicle 122 or the oncoming vehicle 124 is moving laterally as indicated by an arrow A, the vehicle is moving away from the forward direction of the host vehicle 100.

However if neither of the equations (6) and (7) is satisfied for the target object, then this indicates that the target object is separated from each of the left-side and right-side lane marker lines and is not moving laterally away from the forward direction of the host vehicle at a speed exceeding the predetermined value. In that case, the driving support apparatus 10 judges that the possibility of collision between the host vehicle and the target object is not low.

For example as illustrated by the examples in FIG. 6, if the preceding vehicle 122 or the oncoming vehicle 124 is not moving laterally as indicated by an arrow A (away from the forward direction of the host vehicle 100) then it may be moving laterally in the direction of the arrow B, or may soon commence moving in that direction. Hence there is a possibility of collision with the host vehicle 100.

With this embodiment, a mobile object that is subjected to judgement using equations (6) and (7) may be any preceding object or oncoming object which is moving in the same traffic lane as the host vehicle. However it would be possible to limit the judgement to being applied only to those mobile objects which are judged to be preceding vehicles or oncoming vehicles.

If the speed of lateral motion and lane marker line overlap ratio of the target object (mobile object) do not satisfy either of the equations (6) and (7) (NO in step S422), the driving support apparatus 10 judges that the target object is not to be an object of compensation for retarding the TTC operation timing, and processing then returns to step S400.

If the speed of lateral motion and lane marker line overlap ratio of the target object satisfy either of the equations (6) and (7) (YES in step S422), or if the target object is stationary and there is a YES decision in step S416 described above, step S424 is then executed. In step S424, branching is performed in accordance with the type of the target object (as determined previously by the processing of step S410 above).

Specifically, if the target object is one of the types (1) to (9), the driving support apparatus 10 executes step S426, to set a compensation amount of retardation of the TTC operation timing in accordance with that type, and operation then proceeds to step S428. If the target object is of type (10), operation proceeds directly to step S428 without setting a compensation amount for the TTC operation timing. If no compensation amount is set for the TTC operation timing, the compensation amount is initialized to zero in step S426.

When a compensation amount of retardation of the TTC operation timing is set for the target object, the magnitude of the compensation amount is determined using the relationship:

vehicle>pedestrian>stationary object.

In addition, the magnitude of the compensation amount of retardation is determined in accordance with the motion condition of the target object, using the relationship:

preceding(moving)object>oncoming(moving) object>stationary object

In setting a compensation amount of retardation of the TTC operation timing, it would be possible to set the compensation amount irrespective of the type of driving support (i.e., emission of warning indications, braking intervention, etc.) that is to be executed. Alternatively, the compensation amount could be n accordance with the type of driving support that is to be executed (i.e., when respectively different TTC operation timings are applied to the commencement of braking intervention, the commencement of steering intervention, etc.). In the latter case, it is preferable to set a larger value of compensation amount of TTC operation timing retardation for the emission of warning indications, than for the execution of braking intervention. For ease of understanding, only the TTC operation timing for a single type of driving support (e.g., braking intervention) is considered in this description.

In step S428, the driving support apparatus 10 applies a degree of retardation or advancement to the TTC operation timing in accordance with the compensation amount that has been set in step S420 or step S426, and operation then returns to step S400.

With this embodiment as described above, a left-side lane marker line overlap ratio and a right-side lane marker line overlap ratio are derived with respect to a target object, which are respectively the ratio of the distance of the right side of the target object from the left-side lane marker line to the (lateral) width of the target object (as viewed from the host vehicle), and the ratio of the distance of the left side of the target object from the right-side lane marker line to the width of the target object. Each of these ratios takes values exceeding 100% when the target object is within the traffic lane of the host vehicle and is separated from each of the left-side, right-side lane marker lines. Compensation for advancing or retarding the TTC operation timing is applied, based on the lane marker line overlap ratio values and on the motion condition of the target object. Driving support for avoiding collision with the target object can thereby be commenced at an appropriate timing.

In particular, compensation is applied for retarding the TTC operation timing when the target object is judged to be moving laterally away from the forward direction of the host vehicle, since the possibility of collision with a target object is lowered in the case of such a motion condition. It can thereby be ensured that driving support is not executed at an inappropriately early timing.

With respect to the appended claims, a target object information acquisition means recited in the claims is exemplified by the driving support apparatus 10 of the above embodiment in executing the processing steps S400 and S406 (shown in FIG. 2 above) in accordance with the stored program. A lane marker line information acquisition means recited in the claims is similarly exemplified by the execution of step S402, a ratio calculation means is similarly exemplified by the execution of step S404, a motion condition detection means is similarly exemplified by the execution of step S412, and a timing compensation means is similarly exemplified by the execution of steps S420 and S426.

OTHER EMBODIMENTS

With the above embodiment, if either of the above equations (4) and (5) is not satisfied (in the case of a target object which is a stationary object) or if either of the above equations (6) and (7) is not satisfied (in the case of a target object which is a mobile object) a compensation amount of retardation of the TTC operation timing is set irrespective of the values of the left-side and right-side lane marker line overlap ratios that are obtained for the target object. However it would be equally possible to configure the apparatus whereby, in such a case, the compensation amount of retardation of the TTC operation timing is set in accordance with the values of the left-side and right-side lane to marker line overlap ratios. For example, the compensation amount of retardation of the TTC operation timing could be increased in accordance with the degree to which the left-side or right-side lane marker line overlap ratio approaches 0%.

Furthermore it would be possible to configure the apparatus such that when the target object is a mobile object and either of equations (6) or (7) is satisfied for the target object, the higher the absolute value of lateral motion speed of the target object, the greater is made the compensation amount of retardation of the TTC operation timing.

Moreover it would be possible to configure the apparatus such that when a target object has been classified as a vehicle belonging to one of the above-described motion categories (i.e., is a preceding vehicle, a stationary vehicle, or an oncoming vehicle), it is further categorized according to the vehicle type, with the compensation amount of retardation of the TTC operation timing being then modified in accordance with that vehicle type.

For example if the target object is judged to be an oncoming vehicle which is of a type having a highly effective braking capability (i.e., developing a large braking force), then the compensation amount of retardation of the TTC operation timing would be made greater than for the case of a vehicle type having a less effective braking capability, since a vehicle having a highly effective braking capability can be more readily avoided.

Similarly, it can be judged that a type of vehicle having a small width can be more easily avoided than a vehicle having a large width, and hence the compensation amount of retardation of the TTC operation timing could be made greater in the case of a target object which is a vehicle having a small width than in the case of a vehicle having a large width.

Furthermore it would be possible to configure the driving support apparatus such that, when the target object is a preceding vehicle, a vehicle overlap ratio between the preceding vehicle and the host vehicle (e.g., the percentage of the width of the preceding vehicle that overlaps the host vehicle) is taken into consideration when setting the compensation amount of retardation of the TTC operation timing. That is, the compensation amount of retardation would be made greater when the vehicle overlap ratio is small than when it is large.

Moreover the compensation amount of retardation could be made greater, when the width of the traffic lane of the host vehicle is large, than when the width is small.

Furthermore, it is preferable to configure the driving support apparatus such that calculation of the left-side and right-side lane marker line overlap ratios is halted, and that no retardation compensation is applied to the TTC operation timing, if the degree of reliability of detecting the lane marker lines by the camera apparatus 20 is estimated to be below a predetermined value.

Furthermore it would be possible to configure the apparatus such that when one of the right-side or left-side lane marker lines ceases to be detected, the values used in the calculations of equations (1), (2) and (4) to (7) are obtained utilizing an estimated position of the non-detected lane marker line, based on the track of that lane marker line up to the point at which detection failed.

It can thus be understood that the invention is not limited to the embodiment described above, and that various modifications or alternative configurations of the embodiment could be envisaged which fall within the scope claimed for the invention as set out in the appended claims.

What is claimed is:

1. A driving support apparatus for installation in a host vehicle, the host vehicle incorporating a target object information detection apparatus for detecting target objects positioned ahead of the host vehicle and a lane marker line detection apparatus for detecting a pair of lane marker lines delimiting a traffic lane of the host vehicle, the driving support apparatus comprising:
    target object information acquisition means configured for acquiring target object information relating to a target object, based on detection results produced from the target object detection apparatus;
    lane marker line information acquiring means configured for acquiring lane marker line information relating to the pair of lane marker lines, based on detection results produced from the lane marker line detection apparatus;
    ratio calculation means configured for calculating at least one overlap ratio based on the lane marker line information and on the target object information, as a ratio of a value of lateral distance to a value of width of the target object, respectively as measured in a direction at right angles to a forward direction of the host vehicle and respectively as viewed from the host vehicle, the lateral distance comprising a distance between the target object and one of the pair of lane marker lines;

motion condition detection means configured for detecting a motion condition of the target object, based upon the target object information; and, timing compensation means configured for setting a compensation amount of advancement or retardation to be applied to a timing of commencement of a driving support operation, the driving support operation to be potentially executed for avoiding collision between the target object and the host vehicle, and the compensation amount being based upon the overlap ratio calculated by the ratio calculation means and the motion condition detected by the motion condition detection means.

2. The driving support apparatus according to claim 1, wherein the compensation means is configured to set the compensation amount as an amount of retardation of the commencement of the driving support operation, when the motion condition of the target object comprises lateral motion of the target object away from the forward direction of the host vehicle.

3. The driving support apparatus according to claim 1, wherein the compensation means is configured:
to set the compensation amount based only upon the calculated value of the overlap ratio, when the motion condition of the target object is indicative of a stationary object; and
to set the compensation amount based upon the calculated value of the overlap ratio and upon the motion condition of the target object, when the motion condition is indicative of a moving object.

4. The driving support apparatus according to claim 1, wherein one or more of a plurality of respectively different types of driving support operation may be executed with respect to a detected target object, and wherein the compensation means is configured to set respective compensation amounts in accordance with the types of the driving support operation.

5. The driving support apparatus according to claim 4, wherein the types of driving support operation comprise emission of warning indications and execution of braking, and wherein a compensation amount which is applied in the case of emission of warning indications is made greater than a compensation amount which is applied in the case of executing braking.

6. The driving support apparatus according to claim 1, wherein the compensation amount is set in accordance with at least one of the magnitude of the overlap ratio and the motion condition of the target object.

7. The driving support apparatus according to claim 1, wherein the target object information acquisition means is configured to assign the target object to one of a plurality of predetermined target object categories, and wherein the compensation amount is set in accordance with the assigned target object category.

8. The driving support apparatus according to claim 7, wherein the predetermined target object categories comprise at least a pedestrian category and a vehicle category.

9. The driving support apparatus according to claim 8, wherein the target object information acquisition means is configured to select one of a plurality of predetermined vehicle types as corresponding to the target object, when the target object is assigned to the vehicle category, and wherein the compensation is amount is set in accordance with the corresponding vehicle type.

* * * * *